(12) United States Patent
Yorioka et al.

(10) Patent No.: US 7,884,882 B2
(45) Date of Patent: Feb. 8, 2011

(54) MOTION PICTURE DISPLAY DEVICE

(75) Inventors: Keisuke Yorioka, Osaka (JP); Yoshihiro Nakahara, Osaka (JP); Kouji Nakajima, Kyoto (JP); Manabu Kuroda, Hyogo (JP)

(73) Assignee: Panasonic Corporation, Osaka (JP)

( * ) Notice: Subject to any disclaimer, the term of this patent is extended or adjusted under 35 U.S.C. 154(b) by 1196 days.

(21) Appl. No.: 11/513,354

(22) Filed: Aug. 31, 2006

(65) Prior Publication Data

US 2007/0052852 A1    Mar. 8, 2007

(30) Foreign Application Priority Data

Aug. 31, 2005  (JP) .............................. 2005-251178
Aug. 28, 2006  (JP) .............................. 2006-230947

(51) Int. Cl.
*H04N 11/20* (2006.01)
(52) U.S. Cl. ..................................................... 348/556
(58) Field of Classification Search ........................ None
See application file for complete search history.

(56) References Cited

U.S. PATENT DOCUMENTS

| | | | | |
|---|---|---|---|---|
| 5,166,801 A | * | 11/1992 | Yoshikawa | 348/383 |
| 5,303,044 A | * | 4/1994 | Richards | 348/445 |
| 5,434,624 A | * | 7/1995 | Ishimura | 348/563 |
| 5,907,372 A | * | 5/1999 | Oku et al. | 348/716 |
| 5,914,754 A | * | 6/1999 | Kori et al. | 348/455 |
| 6,549,240 B1 | * | 4/2003 | Reitmeier | 348/459 |

FOREIGN PATENT DOCUMENTS

JP          6-326921 A    11/1994

* cited by examiner

*Primary Examiner*—Paulos M Natnael
(74) *Attorney, Agent, or Firm*—McDermott Will & Emery LLP

(57) ABSTRACT

An address generating unit 102 generates a different write start address (w_adr) of a picture memory 105 depending on an aspect ratio and/or a display plane position of a motion picture to be displayed. A picture writing unit 104 writes data to the picture memory 105, starting at the calculated write start address (w_adr). A picture reading unit 108 uses the write start address (w_adr) as a read start address (r_adr) and reads data from the picture memory 105, starting at the read start address (r_adr).

13 Claims, 11 Drawing Sheets

FIG. 3

| | Line 0 | Line 1 | | | | | Line 479 |
|---|---|---|---|---|---|---|---|
| | (719,0) | (719,1) | | | | | (719,479) |
| | | | | | | | |
| | | | | | | | |
| | | | | | | | |
| | (2,0) | (2,1) | | | | | (2,479) |
| | (1,0) | (1,1) | | | | | (1,479) |
| adr_base | (0,0) | (0,1) | | | | | (0,479) |

105

MOTION PICTURE DISPLAY DEVICE

BACKGROUND OF THE INVENTION (1) Field of the Invention

The present invention relates to a motion picture display device for sequentially displaying, without interruption, different types of motion pictures having different picture configurations. The present invention especially relates to a picture memory management technique.

(2) Description of the Related Art

For displaying a motion picture having been decoded, image processing may be required to, for example, scale up the picture size to an appropriate size. Conventionally, a picture memory is employed to temporarily store picture data resulting from such image processing.

A motion picture display device controls writing of picture data to and reading of the picture data from the picture memory. The motion picture display device displays a motion picture by sequentially reading picture data from the picture memory in accordance with the timing determined by the NTSC or PAL format.

Taking the NTSC format as an example, a frame of picture data is composed of a top field and bottom field. The motion picture display device alternately writes the top field data and the bottom field data into different areas of the picture memory at every field period, i.e., half a frame period. In parallel with the data write, the motion picture display device reads picture data from the picture memory at every field period, so that the field data already written to the picture memory is supplied to display the motion picture.

More specifically, the motion picture display device starts a write operation to write, for example, the bottom field data of a frame in one field period. In parallel with the write operation and within the same field period, the motion picture display device performs a read operation to display the top field data of the same frame having been written in the previous field period. In the subsequent field period, the motion picture display device starts a read operation to display the bottom field data written in the previous field period, in parallel with a write operation to write the top field data of a subsequent frame to be displayed in a yet another field period subsequent to the current field period.

It should be noted that picture data written to the picture memory within one field period is worth one field, whereas picture data read from the picture memory within one field period may be worth one frame, rather than one field. This is because a data read operation to display either of the top and bottom fields requires data of the other field.

It is not necessary to synchronize read and write operations to and from the picture memory. Instead, a read operation from and a write operation to the picture memory may be controlled to be out of synchronism, which is called asynchronous control. Under asynchronous control, read operations and write operations are separately controlled and there is a delay of one field period between a write operation and a read operation of data of a specific field.

Unfortunately, however, the asynchronous access control involves a risk of so-called overtaking, although the risk is small. Overtaking refers to a phenomenon in which a write operation of picture data to the picture memory occurs before previously written picture data is read from the memory or a read operation to read picture data from the picture memory occurs before the picture data is written. An occurrence of overtaking may cause image disturbance for one field period.

The overtaking phenomenon occurs as a result of making every access to the picture memory at the base address, irrespective of the fact that motion pictures of different aspect ratios requires memory access at different access start timing.

In order to prevent an occurrence of overtaking, the following patent document suggests providing two picture memories.

[Patent Document 1] Patent Application Publication No. JP 06-326921

Unfortunately, however, sequential display of motion pictures having different aspect ratios and/or display plane positions will inevitably cause image disturbance at the time of a changeover between the motion pictures.

For the purpose of more specific description, it is supposed that a motion picture display device is designed for displaying, as a standard, a motion picture having an aspect ratio of 4:3. It is also supposed that the motion picture display device sequentially displays a motion picture having an aspect ratio of 16:9 and then a motion picture having an aspect ratio of 4:3 under asynchronous-access control.

The motion picture display device starts reading the picture memory in accordance with the display timing of a motion picture to be displayed. Thus, in the case of displaying the 16:9 motion picture, no picture data is read from the picture memory during the time output is made to display black bars at the top and bottom of the display plane. As a consequence, the timing of a read operation from the picture memory for displaying the 16:9 motion picture is later than the timing of a read operation from the picture memory for displaying the 4:3 motion picture. The delay time corresponds to the time taken to output the black bar. Similarly, since a write operation to the picture memory starts one field period before the start of a subsequent read operation as described-above, the timing of a write operation to the picture memory for displaying the 16:9 motion picture is later than the timing of a write operation for displaying the 4:3 motion picture.

During the time the motion picture display device is reading the last field data of the 16:9 motion picture from the picture memory, the first field data of the 4:3 motion picture, which is to be displayed one field period later, is written to the picture memory. Normally, the last field data of the 16:9 motion picture needs to be read from the picture memory before the first field of the 4:3 motion picture is written to the picture memory.

For the reason described above, however, the start timing of a read operation for the 16:9 motion picture is later than the display timing of the 4:3 motion picture. Consequently, the first write operation for the 4:3 motion picture overtakes the last read operation for the 16:9 motion picture. Thus, the picture data read by the read operation is not the picture data of the 16:9 motion picture written to the picture memory in the immediately previous field period. Rather, the picture data of the 4:3 motion picture written to the picture data as a result of the overtaking is read. This inevitably causes the image disturbance.

Although the patent document 1 cited above manages to solve the problem, the disclosed technique requires two picture memories to be provided, which increases the manufacturing cost of the device.

SUMMARY OF THE INVENTION

In view of the above, the present invention aims to provide a motion picture display device capable of preventing image disturbance resulting from an occurrence of overtaking, without recurring additional picture memory.

In order to solve the problems noted above, the present invention provides a motion picture display device for sequentially displaying two types of motion pictures having different aspect ratios. Each motion picture is displayed by repeating a cycle of writing picture data to and reading the picture data from a picture memory in accordance with display timing that is determined relatively to an aspect ratio of the picture data. The motion picture display device includes: an acquiring unit operable to acquire an aspect ratio of picture data that is currently targeted to be displayed; an address generating unit operable to calculate a write start address in accordance with the acquired aspect ratio of the target picture data; a picture writing unit operable to write the target picture data to the picture memory, staring at the write start address and at a point in time determined by display timing of the target picture data; and a picture reading unit operable to read the target picture data from the picture memory, starting at a read start address, that is equal to the write start address and substantially in synchronism with the display timing of the target picture data.

As described above, at the time of a changeover between two motion pictures having different aspect ratios, there is a risk that a read operation to read the last field data of a motion picture having an aspect ratio of 16:9 is overtaken by a write operation to write the first field data of a motion picture having a 4:3 aspect ratio, which is to be displayed in the subsequent field period.

However, the motion picture display device having the above structure prevents an occurrence of the overtaking. The motion picture display device calculates a write start address at which the picture memory is to be accessed, relatively to the aspect ratio of picture data to be displayed. Because of the thus calculated write start address, it is ensured that the read operation at the time of the changeover is performed to read picture data of the 16:9 motion picture, starting at the memory address where no picture data of the 4:3 motion picture is written.

Now, the calculation of a write start address is described in further detail.

As described above, the overtaking occurs as a result of accessing the picture memory constantly at the base address, regardless of the fact that appropriate access start timing is different for each motion picture having a different aspect ratio.

That is to say, if it is ensured that each memory location is accessed at the constant timing within each of write and read operations, the overtaking never occurs irrespective of aspect ratios of motion pictures to be sequentially displayed.

In view of the above, the address generating unit may include: a storage subunit operable to store a normal aspect ratio indicating an aspect ratio of a reference motion picture; and a calculating subunit operable to calculate the write start address based on a ratio between the normal aspect ratio and the acquired aspect ratio.

More specifically, the address generating unit may be operable to calculate the write start address w_adr using the following expression:

$$w\_adr = adr\_base + line\_size \times v\_size \times \{1 - aspect/aspect\_normal\}/2$$

where adr_base denotes a base address of the picture memory, line_size denotes a line size of the picture memory, v_size denotes a vertical size of the picture data, aspect denotes the aspect ratio of the target picture data, and aspect_normal denotes the normal aspect ratio.

Further, the calculating subunit may be operable to calculate the write start address in accordance with a display start position of the motion picture that is determined relatively to the ratio between the two aspect ratios.

The motion picture display device having the above structure calculates a write start address based on the ratio between the two aspect ratios. Because of the thus calculated write start address, it is ensured that each memory location is accessed at the constant timing within each of read and write operations.

Further, the motion picture display device may further include: a decoding unit operable to decode an encoded motion picture. The decoding unit may be operable to generate the aspect ratio of the target picture data upon decoding. The acquiring unit may be operable to acquire the aspect ratio generated by the decoding unit.

With the above structure, the access control to the picture memory is executed without the need to acquire the aspect ratio from an external source.

Further, the acquiring unit may be operable to acquire plane information indicating a vertical position of a motion picture display plane. The address generating unit may be operable to calculate the write start address based on the acquired aspect ratio of the target picture data and the plane information.

Further, the acquiring unit may include a plane information acquiring subunit operable to acquire plane information indicating a vertical position of a motion picture display plane. The address generating unit may be operable to calculate the write start address w_adr using the following expression:

$$w\_adr = adr\_base + line\_size \times v\_plane\_pos + line\_size \times (v\_size - v\_plane_{pos}) \times \{1 - aspect/aspect\_normal\}/2$$

where adr_base denotes a base address of the picture memory, line_size denotes a line size of the picture memory, v_plane_pos denotes the plane information, v_size denotes a vertical size of the picture data, aspect denotes the aspect ratio of the target picture data, and aspect_normal denotes the normal aspect ratio.

With the above structure, the motion picture display device is capable of acquiring the display plane position of the motion picture to be displayed, even if the display plane position of each motion picture is different. This allows the motion picture display device to estimate the display timing of the motion picture, i.e. the access timing to the picture memory.

Consequently, it is ensured that each memory location of the picture memory is accessed at the constant access timing within each of read and write operations, even in the case of sequentially displaying motion pictures having different aspect ratios and/or display plane positions.

In another aspect, the present invention provides a motion picture display device for sequentially displaying two types of motion pictures having different display plane positions. Each motion picture is displayed by repeating a cycle of writing picture data to and reading the picture data from a picture memory in accordance with display timing that is determined relatively to a display plane position of the picture data. The motion picture display device includes: an acquiring unit operable to acquire plane information indicating a display plane position of picture data that is currently targeted to be displayed; an address generating unit operable to calculate a write start address in accordance with the acquired plane information; a picture writing unit operable to write the target picture data to the picture memory, staring at the write start address and at a point in time determined by display timing of the target picture data; and a picture reading unit operable to read the target picture data from the picture memory, starting at a read start address that is equal to the write start address and substantially in synchronism with the display timing of the target picture data.

By acquiring the display plane position of a respective motion picture, the motion picture display device is enabled to estimate the display timing of a respective one of the motion pictures having different display plane positions.

Due to the advantageous features, it is ensured that each memory location of the picture memory is accessed at the constant access timing within each of read and write operations, even in the case of sequentially displaying motion pictures having different display plane positions.

The motion picture display device may further include: a decoding unit operable to decode an encoded motion picture. The decoding unit may be operable to generate the plane information upon decoding the target picture data. The acquiring unit may be operable to acquire the plane position information generated by the decoding unit.

In yet another aspect, the present invention provides a motion picture display method for use by a motion picture display device that sequentially displays two types of motion pictures having different aspect ratios. Each motion picture is displayed by repeating a cycle of writing picture data to and reading the picture data from a picture memory in accordance with display timing that is determined relatively to an aspect ratio of the picture data. The motion picture display method includes: an acquiring step of acquiring an aspect ratio of picture data that is currently targeted to be displayed; an address generating step of calculating a write start address in accordance with the acquired aspect ratio of the target picture data; a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data.

In yet another aspect, the present invention provides a motion picture display method for use by a motion picture display device that sequentially displays two types of motion pictures having different display plane positions. Each motion picture is displayed by repeating a cycle of writing picture data to and reading the picture data from a picture memory in accordance with display timing that is determined relatively to a display plane position of the picture data. The motion picture display method includes: an acquiring step of acquiring plane information indicating a display plane position of picture data that is currently targeted to be displayed; an address generating step of calculating a write start address in accordance with the acquired plane information; a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data.

In yet another aspect, the present invention provides a computer-readable control program composed to be executed by a motion picture display device that sequentially displays two types of motion pictures having different aspect ratios. Each motion picture is displayed by repeating a cycle of writing picture data to and reading the picture data from a picture memory in accordance with display timing that is determined relatively to an aspect ratio of the picture data. The control program includes code operable to cause the motion picture display device to perform: an acquiring step of acquiring an aspect ratio of picture data that is currently targeted to be displayed; an address generating step of calculating a write start address in accordance with the acquired aspect ratio of the target picture data; a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data.

In yet another aspect, the present invention provides a computer-readable control program composed to be executed by a motion picture display device that sequentially displays two types of motion pictures having different display plane positions. Each motion picture is displayed by repeating a cycle of writing picture data to and reading the picture data from a picture memory in accordance with display timing that is determined relatively to a display plane position of the picture data. The control program includes code operable to cause the motion picture display device to perform: an acquiring step of acquiring plane information indicating a display plane position of picture data that is currently targeted to be displayed; an address generating step of calculating a write start address in accordance with the acquired plane information; a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 illustrates a picture memory 105;

DESCRIPTION OF THE PREFERRED EMBODIMENT

Embodiment 1

The following describes a motion picture display device according to the present invention, with reference to the accompanying drawings.

An embodiment 1 below is described by way of a motion picture display device for displaying a motion picture in accordance with the timing determined by the NTSC format.

It is assumed that in each vertical scanning period of the top field, a write operation is performed before a read operation. More specifically, a write operation to write the bottom field data is performed before a read operation to display the top field image.

It is assumed, in addition, that in each vertical scanning period of the bottom field, a read operation is performed before a write operation. That is, a read operation to display the bottom field image is performed before a write operation to write the top field data.

<Structure>

1.1 Structure

First of all, a description is given of a motion picture decoder that includes a motion picture display device according to the present invention.

Figure 1:
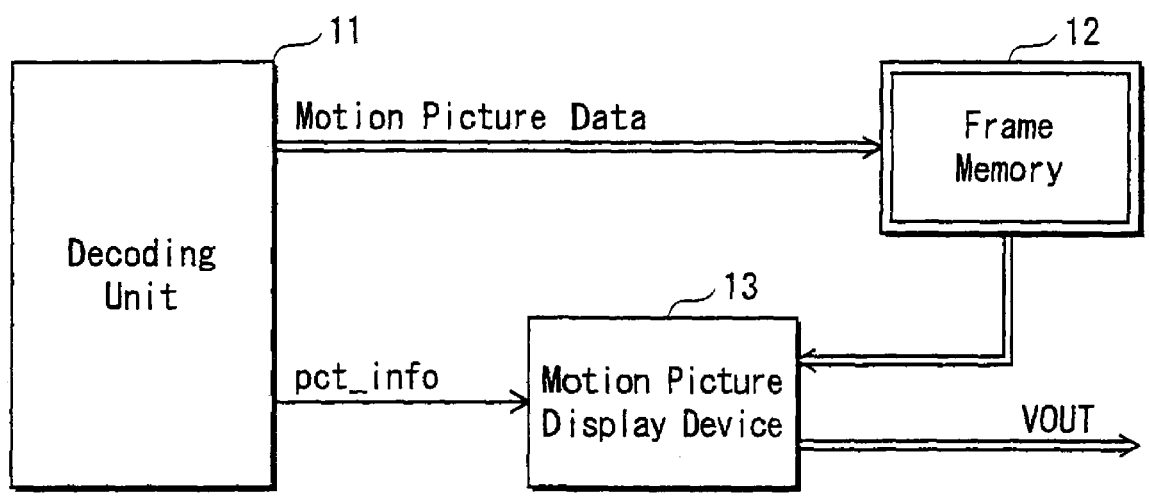
FIG. 1 illustrates the overall structure of a motion picture decoder 1.

FIG. 1 illustrates the overall structure of the motion picture decoder 1.

As illustrated in FIG. 1, the motion picture decoder 1 is composed of a decoding unit 11, a frame memory 12, and a motion picture display device 13.

1.1.1 Decoding Unit 11

The decoding unit 11 receives input of video data, such as MPEG-2 (Moving Picture Experts Group phase 2) video, from a non-illustrated external device. The decoding unit 11 then decodes the motion picture data in accordance with a decoding instruction received from a non-illustrated control device. As a result of the decoding, picture data is obtained. Note that picture data used herein refers to information defining a frame of image data and is composed of luminance data and chrominance difference data. The decoding unit 11 sequentially writes picture data, which is obtained by decoding, into the frame memory 12.

In parallel with the decoding of the motion picture data, the decoding unit 11 generates picture-configuration information (pct_info) defining the configuration of picture data. The thus generated picture-configuration information (pct_info) is output to the motion picture display device 13.

Note that the picture-configuration information (pct_info) includes the vertical size (v_size) and aspect ratio information (aspect). The vertical size (v_size) indicates the picture size in the vertical direction, and the aspect ratio information (aspect) indicates the aspect ratio of the picture data. At the time of decoding the motion picture, the decoding unit 11 acquires picture-configuration information (pct_info) that includes the vertical size (v_size) and aspect ratio information (aspect).

The decoding unit 11 generates the vertical size (v_size) and the aspect ratio information (aspect) by executing the decoding of the video data. According to the present embodiment, the aspect ratio information (aspect) takes on a value 9/16 representing the aspect ratio of 16:9.

In the present embodiment, the aspect ratio information is used as the picture-configuration information. Yet, instead of the aspect ratio information, the length-to-width ratio of picture data or the length-to-width ratio of a pixel may be used as picture-configuration information.

1.1.2 Frame Memory 12

The frame memory 12 is RAM (Random Access Memory) for storing picture data obtained as a result of the decoding by the decoding unit 11. In the NTSC format, for example, the frame memory 12 has two separate memory areas each having a capacity of 720 pixels×480 lines for storing luminance data and chrominance difference data of a frame of picture data.

Normally, the frame memory 12 has a plurality of memory areas each having a capacity of 720 pixels×480 lines. For the sake of simplicity in the description, however, the frame memory 12 according to the present embodiment is described to have two 720 pixels×480 lines memory areas, one for storing luminance data and the other for chrominance difference data for one frame of picture data.

1.1.3 Motion Picture Display Device 13

The motion picture display device 13 receives picture-configuration information (pct_info) from the decoding unit 11 and sequentially reads picture data from the frame memory 12. Note that the motion picture display device 13 controls read operations of picture data from the frame memory 12, based on the received picture-configuration information (pct_info). The picture data read from the frame memory 12 is output as display image (VOUT) to a non-illustrated display output device. The display output device displays the display image (VOUT), which is output from the motion picture display device 13, in the NTSC format.

Now, the motion picture display device 13 is described in detail.

Figure 2:
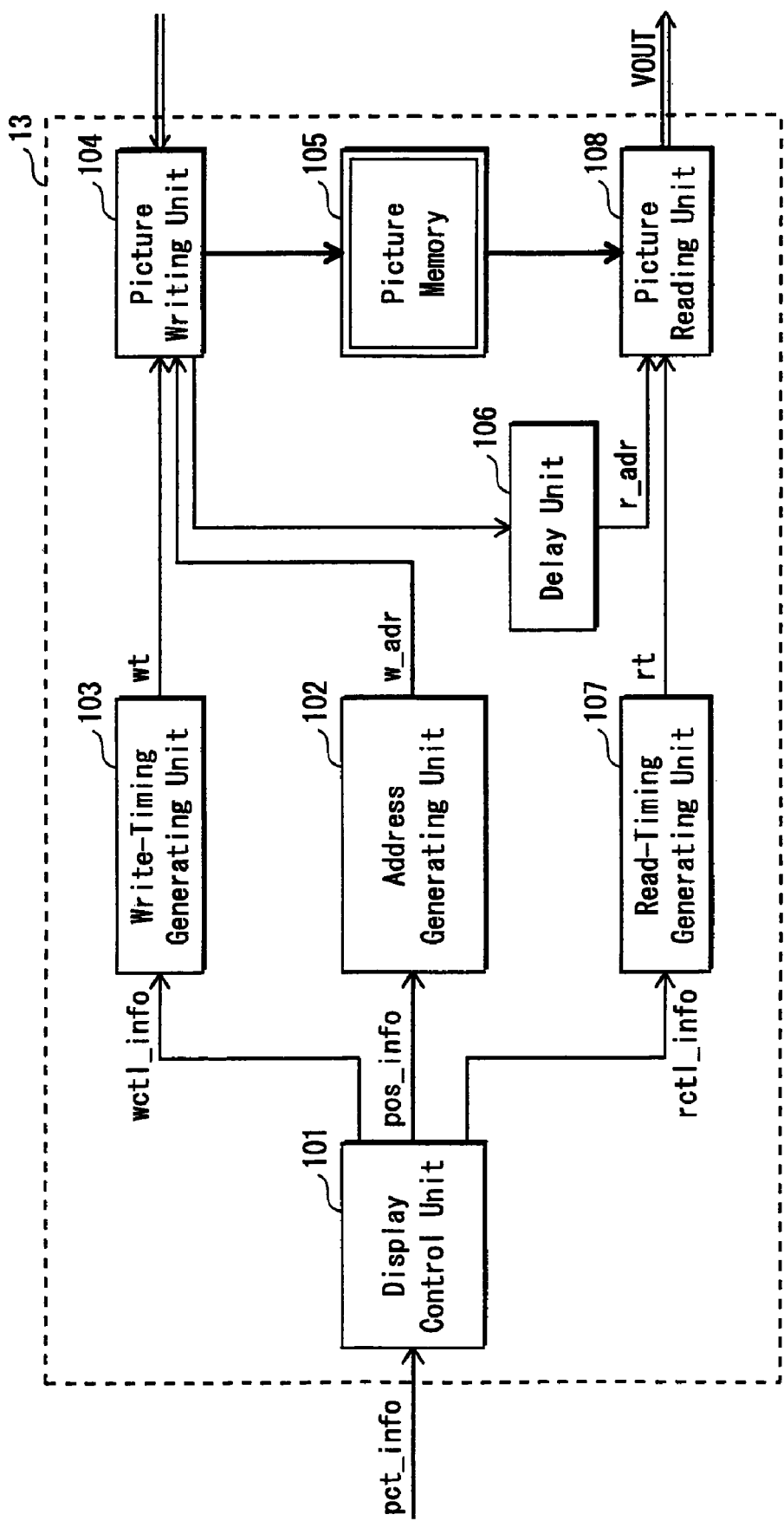
FIG. 2 illustrates the internal structure of a motion picture display device 13.

FIG. 2 illustrates the internal structure of the motion picture display device 13 according to the present invention.

As illustrated in FIG. 2, the motion picture display device 13 includes a display control unit 101, an address generating unit 102, a write-timing generating unit 103, a picture writing unit 104, a picture memory 105, a delay unit 106, a read-timing generating unit 107, and a picture reading unit 108.

1.1.3.1 Display Control Unit 101

The display control unit 101 controls the display position and display timing of picture data displayed on a non-illustrated display device.

In further detail, the display control unit 101 receives picture-configuration information (pct_info) output from the decoding unit 11 and extracts vertical size (v_size) and aspect ratio information (aspect) from the received picture-configuration information (pct_info). The display control unit 101 then outputs display position information (pos_info) that is composed of the extracted vertical size (v_size) and aspect ratio information (aspect) to the address generating unit 102.

In addition, the display control unit 101 outputs write control information (wctl_info) to the write-timing generating unit 103. The write control information (wctl_info) indicates the timing at which the picture writing unit 104 is to write picture data to the picture memory 105.

In addition, the display control unit 101 outputs read control information (rctl_info) to the read-timing generating unit 107. The read control information (rctl_info) indicates the timing at which the picture reading unit 108 is to read picture data from the picture memory 105.

In the present embodiment, the display control unit 101 determines the timing of read and write operations, so that picture data is read from the picture memory 105 in accordance with the timing defined by the NTSC format.

More specifically, the display control unit 101 defines the timing of read operations to read picture data from the picture memory 105, based on the vertical size (v_size) and aspect-ratio information (aspect).

For example, in the case of a motion picture having a 16:9 aspect ratio, black bars are displayed at the top and bottom of the display plane. In view of this, the display control unit 101 determines the timing of a read operation based on the vertical size (v_size) and aspect ratio information (aspect), so that the read operation is started after display of the top black bar is completed. Note that the timing of a write operation to write picture data to the picture memory 105 is determined to be one field period before the timing of a read operation to read the picture data from the picture memory 105.

The read timing and write timing determined in the above manner are supplied to the read-timing generating unit 107 and write-timing generating unit 103 in the form of read control information (rctl_info) and write control information (wctl_info), respectively. In addition, the timing of write operations and read operations are independently controlled.

1.1.3.2 Address Generating Unit 102

The address generating unit 102 calculates the write start address (w_adr) at which the picture writing unit 104 is to start writing picture data into the picture memory 105. The calculated write start address (w_adr) is output to the picture writing unit 104.

In further detail, the address generating unit 112 receives display position information (pos_info) output from the display control unit 101. The address generating unit 102 then calculates the write start address (w_adr) of the picture memory 105 given by applying Expression 1 below using the aspect ratio information (aspect) included in the received display position information (pos_info) and the base address (adr_base) of the picture memory 105. The thus calculated write start address (w_adr) is output to the picture writing unit 104.

$$w\_adr = adr\_base + 720 \times v\_size \times \{1 - aspect/aspect\_normal\}/2 \quad \text{[Expression 1]}$$

Hereinafter, an additional description of Expression 1 is given.

The aspect_normal denotes the normal or standard aspect ratio for which the motion picture display device 13 is designed. In the present embodiment, the normal aspect ratio of the motion picture display device 13 is 4:3. Thus, aspect_normal takes on a value "3/4".

In the case of picture data having an aspect ratio of 4:3, i.e. the aspect ratio information takes on a value "3/4", the write start address (w_adr) of the picture memory 105 given by Expression 1 is equal to the base address (adr_base) the picture memory 105.

Not that the aspect ratio information (aspect) cannot take on a value causing that the second term in Expression 1 takes on a negative value. The value "720" appearing in the right side of Expression 1 represents the line size of the picture memory 105.

1.1.3.3 Write-Timing Generating Unit 103

The write-timing generating unit 103 receives write control information (wctl_info) output from the display control unit 101. At the timing indicated in the received write control information (wctl_info), the write-timing generating unit 103 outputs to the picture writing unit 104 a write-timing signal (wt) that instructs the picture writing unit 104 to start a write operation.

1.1.3.4 Picture Writing Unit 104

The picture writing unit 104 reads picture data from the frame memory 12 and writes the read picture datad to the picture memory 105 at the predetermined memory address.

In further detail, the picture writing unit 104 receives a write start address (w_adr) output from the address generating unit 102 and also receives write-timing signal (wt) output from the write-timing generating unit 103. Upon receipt of the write-timing signal (wt), the picture writing unit 104 writes one field of picture data (top or bottom field) to the picture memory 105 on a line-by-line basis, starting at the received write start address.

In parallel with the write operation to the picture memory 105, the picture writing unit 104 outputs the write start address (w_adr) received from the address generating unit 102 to the delay unit 106.

1.1.3.5 Picture Memory 105

The picture memory 105 is RAM for temporality storing picture data to display the picture data stored on the frame memory 12.

FIG. 3 illustrates the picture memory 105. As illustrated in FIG. 3 and similarly to the frame memory 12, the picture memory 105 has two memory areas each having a capacity of 720 pixels×480 lines for storing the luminance data and chrominance difference data of a frame of picture data.

In FIG. 3, "adr_base" denotes the base address of the picture memory 105. In the present embodiment, the picture writing unit 104 writes the top field data into Line 0 and the even-numbered lines (Line 2, Line 4, . . . ) of the picture memory 105, and writes the bottom field data into the odd-numbered lines (Line 1, Line 3, . . . ) of the picture memory 105.

Note, however, that the manner of writing picture data to the picture memory 105 is not limited to the above. For example, it is applicable to write the bottom field data into Line 0 and the even-numbered lines.

1.1.3.6 Delay Unit 106

The delay unit 106 receives the write start address (w_adr) from the picture writing unit 104 and outputs the received write start address (w_adr) to the picture reading unit 108 for use as the read start address (r_adr). Note that the delay unit 106 outputs the write start address with a delay of one field period from the time of reception. That is say, the delay unit 106 so operates that the write start address (w_adr) at which the picture writing unit 104 performs a write operation is caused to be used as the read start address (r_adr) in a subsequent read operation that is performed by the picture reading unit 108 one field period after the write operation.

1.1.3.7 Read-Timing Generating Unit 107

The read-timing generating unit 107 receives read control information (rctl_info) output from the display control unit

101. At the timing indicated in the received read control information (rctl_info), the read-timing generating unit 107 outputs to the picture reading unit 108 a read-timing signal (rt) that instructs the picture reading unit 108 to start a read operation.

1.1.3.8 Picture Reading Unit 108

The picture reading unit 108 reads picture data from the picture memory 105 at the predetermined memory address and outputs the read picture data to the non-illustrated display device.

More specifically, the picture reading unit 108 receives the read start address (r_adr) output from the delay unit 106 and also receives the read-timing signal (rt) output from the read-timing generating unit 107. Upon receipt of the read-timing signal (rt), the picture reading unit 108 reads picture data from the picture memory 105, starting at the read start address (r_adr) on a line-by-line basis. The thus read picture data is sequentially output to the non-illustrated display output device as display image (VOUT).

<Operation>

1.2 Operations

Next, operations of the motion picture display device 13 will be described.

Figure 4:
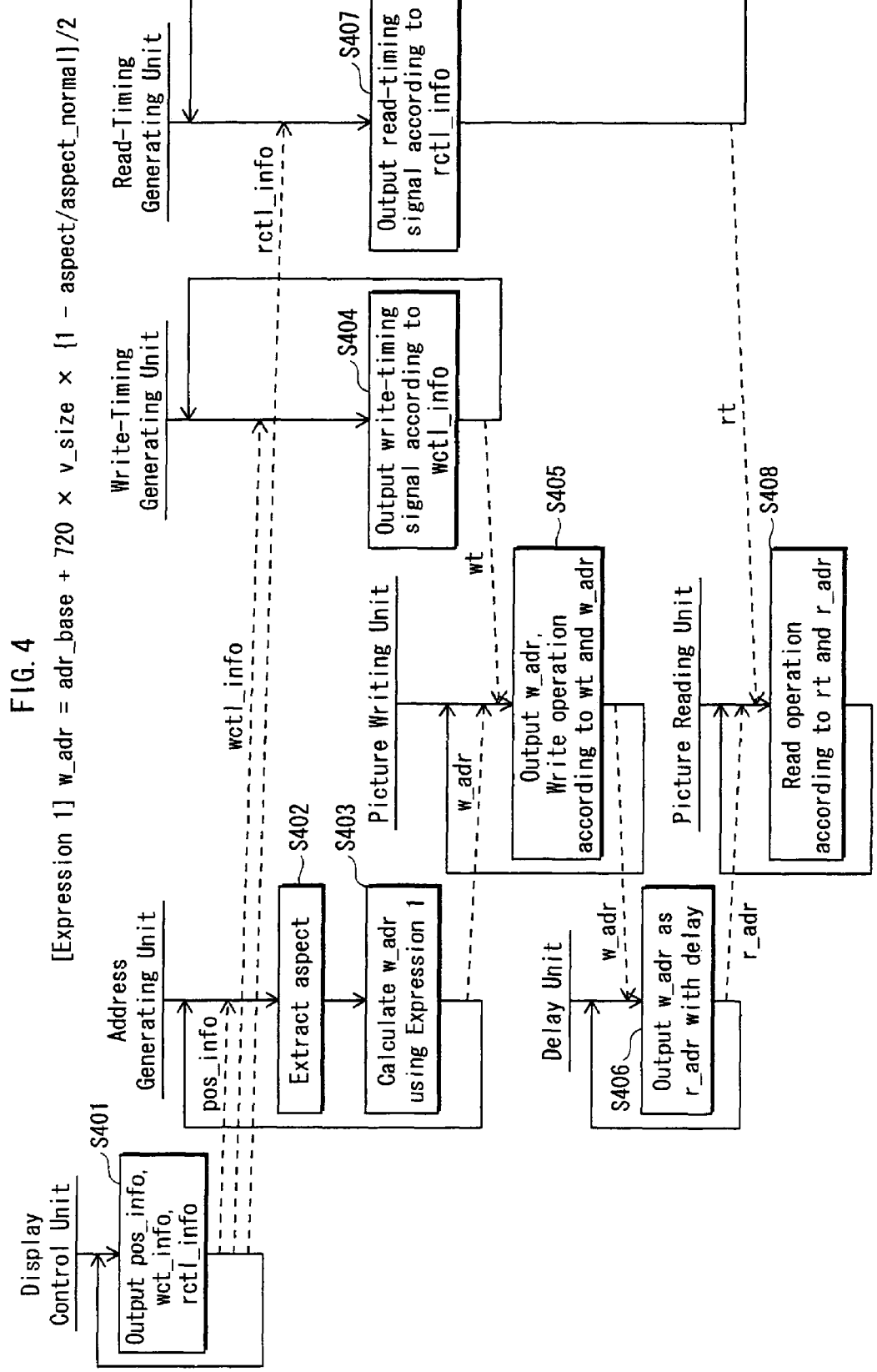
FIG. 4 is a flowchart of operations performed by the motion picture display device 13 to output one field data.

FIG. 4 is a flowchart of operations performed by the motion picture display device 13 to output one field data.

As illustrated in FIG. 4, upon receipt of picture-configuration information (pct_info) from the decoding unit 11, the display control unit 101 extracts the vertical size (v_size) and aspect ratio information (aspect) from the received picture-configuration information (pct_info). The display control unit 101 outputs the extracted data as display position information (pos_info) to the address generating unit 102. The display control unit 101 also outputs write control-information (wctl_info) to the write-timing generating unit 103 and read control information (rctl_info) to the read-timing generating unit 107 (Step S401).

The address generating unit 102 extracts aspect ratio information (aspect) from the display position information (pos_info) (Step S402). The address generating unit 102 then calculates a write start address (w_adr) given by Expression 1, which uses the ratio between the extracted aspect ratio information and the normal aspect ratio (aspect_normal) (Step S403). The thus calculated write start address (w_adr) is output to the picture writing unit 104.

The write-timing generating unit 103 outputs a write-timing signal (wt) to the picture writing unit 104 at the timing indicated in the write control information (wctl_info) (Step S404).

Upon receipt of the write-timing signal (wt), the picture writing unit 104 writes either of the fields to the picture memory 105, starting at the write start address (w_adr). In addition, the picture writing unit 104 outputs the write start address (w_adr) to the delay unit 106 (Step S405).

The delay unit 106 outputs the received write start address (w_adr) as a read start address (r_adr) to the picture reading unit 108 with a delay of one field period (Step S406).

The read-timing generating unit 107 outputs a read-timing signal (rt) to the picture reading unit 108 at the timing indicated in the read control information (rctl_info) (Step S407).

Upon receipt of the read-timing signal (rt), the picture reading unit 108 reads picture data from the picture memory 105, starting at the read start address (r_adr) (Step S408). The thus read picture data is output as display image (VOUT).

Figure 5:
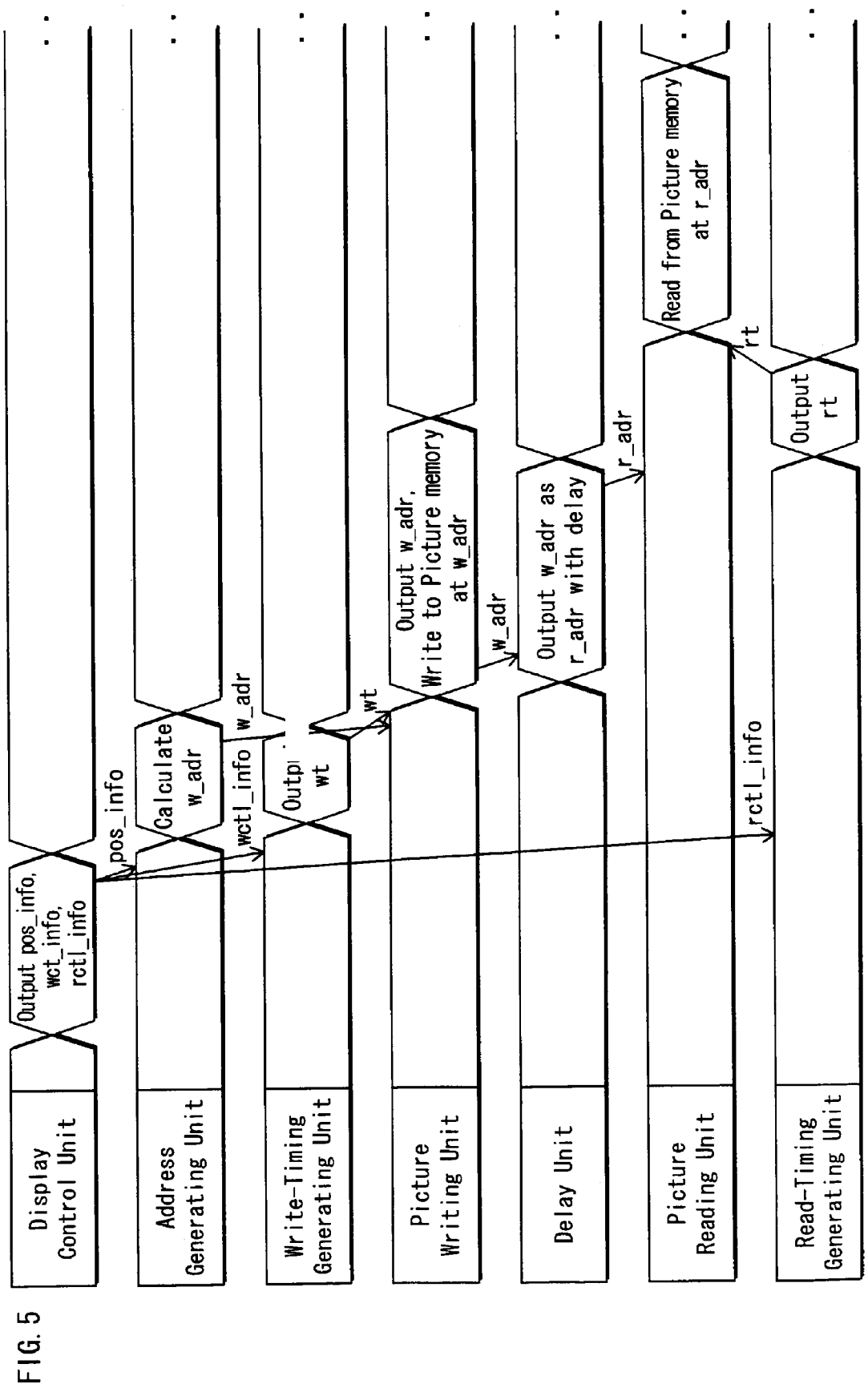
FIG. 5 is a timing chart of the operations performed by the motion picture display device 13 to output one field data.

The above operations are illustrated in FIG. 5. FIG. 5 is a timing chart of the operations performed by the motion picture display device 13 to output one field data. The horizontal axis in FIG. 5 represents time.

1.2.1 Displaying Motion Picture Having Aspect Ratio of 4:3

Figure 6:
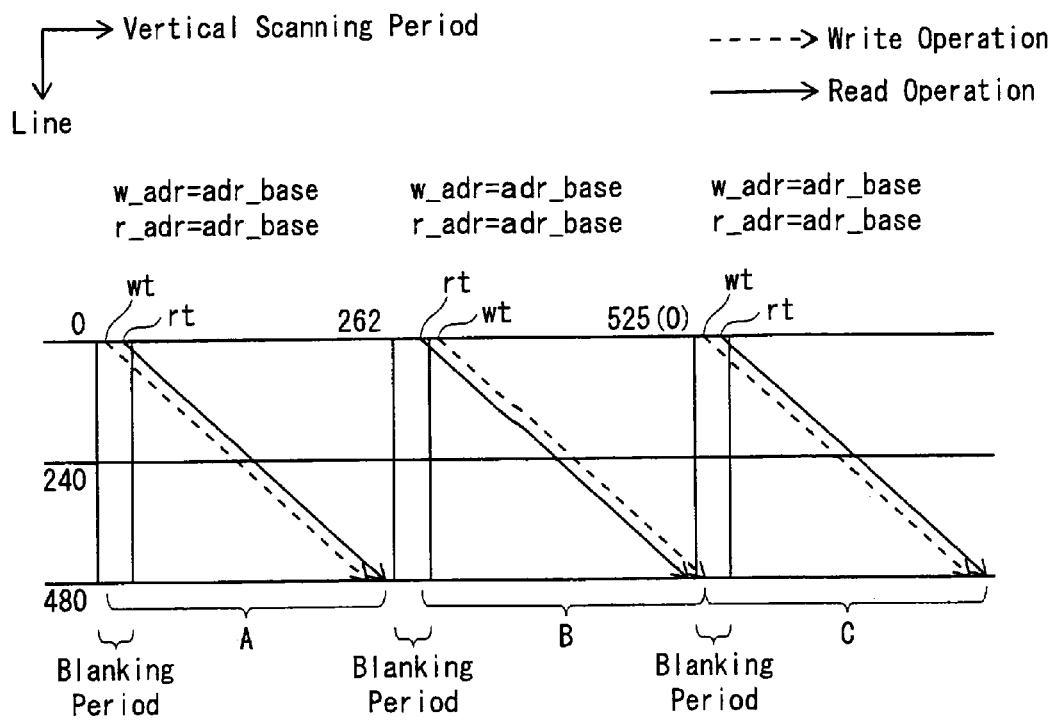
FIG. 6 schematically illustrates write and read operations performed to display a motion picture having a 4:3 aspect ratio.

With reference to FIG. 6, operations of the picture memory 105 are described.

FIG. 6 schematically illustrates write and read operations performed to display a motion picture having a 4:3 aspect ratio.

In FIG. 6, the horizontal axis represents the vertical scanning period, whereas the vertical axis represents the line numbers of the picture memory 105. The dashed arrows represents write operations to the picture memory 105, whereas the solid-line arrows represent read operations from the picture memory 105.

Since the aspect ratio information takes on a value "3/4", the write start address (w_adr) given by Expression 1 is equal to the base address (adr_base). Consequently, write and read operations to/from the picture memory 105 are all started from Line 0.

In addition, FIG. 6 illustrates a plurality of vertical scanning periods each corresponding to one field (Periods A, B, C, . . . ). Periods A, C . . . are vertical scanning periods of the top field, whereas Periods B, . . . are vertical scanning periods of the bottom field.

In each vertical scanning period (periods A, C, . . . ) of the top field, a write operation to write the bottom field data is performed before a read operation to read data from the picture memory 105. Triggered by a write-timing signal (wt), the picture writing unit 104 starts a write operation to write the bottom field data. Then, triggered by a read-timing signal (rt), the picture reading unit 108 starts a read operation to read data from the picture memory 105.

In each vertical scanning period (Periods B, . . . ) of the bottom field, a read operation to read data from the picture memory 105 is started before a write operation to write the top field data.

The above operations in Periods A and B are alternately repeated, so that the motion picture display device 13 outputs the data stored on the frame memory 12 to the display output device.

1.2.2 Displaying Motion Picture Having Aspect Ratio of 16:9

Figure 7:
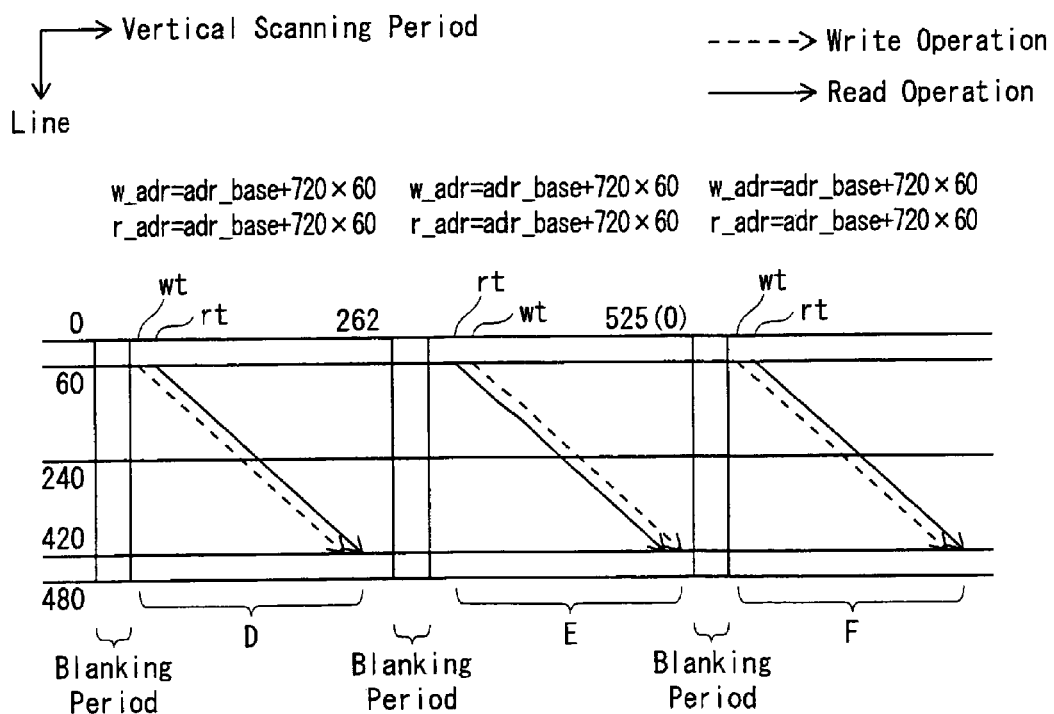
FIG. 7 schematically illustrates write and read operations performed to display a motion picture having a 16:9 aspect ratio.

FIG. 7 schematically illustrates write and read operations performed to display a motion picture having a 16:9 aspect ratio. Note that Periods D, F, . . . are vertical scanning periods of the top field, whereas Periods E, . . . are vertical scanning periods of the bottom field.

The aspect ratio information takes on a value "9/16" and the vertical size (v_size) is "480". Thus, the following write start address (w_adr) is given by Expression 1.

$$w\_adr = adr\_base + 720 \times 60.$$

That is, during the time the motion picture having a 16:9 aspect ratio is displayed, the motion picture display device 13 starts each read and write operation at Line 60 of the picture memory 105.

The picture reading unit 108 needs to perform read operations from the picture memory 105 in accordance with the display timing of the non-illustrated display output device. For this reason, a read-timing signal (rt) is issued with a delay in comparison with a read-timing signal issued for displaying a motion picture having an aspect ratio of 4:3. The delay time corresponds to 30 lines, which are half of 60 lines. This is because a write operation is performed on a field-by-field basis to write data to every other line. Naturally, a write-timing signal (wt) is issued with a delay corresponding to 30 lines in comparison with a write-timing signal issued for displaying a motion picture having an aspect ratio of 4:3.

1.2.3 Changeover Between Motion Pictures of Different Aspect Ratios

Next, a description is given of write and read operations to/from the picture memory 105 performed at the time of a changeover from a motion picture having a 16:9 aspect ratio to a motion picture having a 4:3 aspect ratio.

Figure 8:
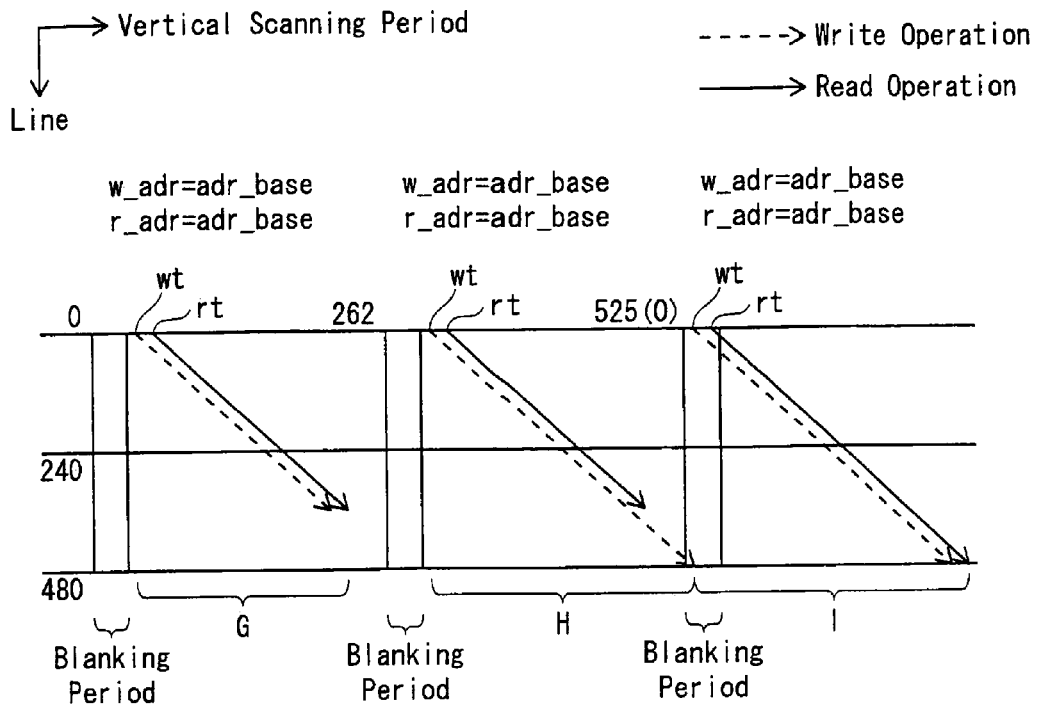
FIG. 8 schematically illustrates write and read operations performed by a conventional device not having an address generating unit 102 to sequentially display motion pictures having different aspect ratios.

First, a description is given of a conventional motion picture display device not having the address generating unit 102, which is a feature of the present invention. FIG. 8 schematically illustrates write and read operations performed by the conventional motion picture display device not having the address generating unit 102 to sequentially display motion pictures having different aspect ratios. Without the address generating unit 102, the write start address (w_adr) and read start address (r_adr) used by the conventional motion picture display device for read and write operations are always equal to the base address (adr_base) of the picture memory 105.

Note that Periods G, I, . . . are vertical scanning periods of the top field, whereas Periods H, . . . are vertical scanning periods of the bottom field.

In Period G, the bottom field data of the last frame of the 16:9 motion picture is written.

Next, in Period H, a read operation to display the 16:9 motion picture and a write operation to write the top field data of the first frame of the 4:3 motion picture are performed. In Period I and the following periods, read and write operations are performed to read and write data of the 4:3 motion picture.

In Period H, the timing of the read operation to read data of the 16:9 motion picture is delayed for 30 lines as compared with the timing of a read operation to read data of the 4:3 motion picture.

On the other hand, however, a write operation in Period H to write data of the 4:3 motion picture is started one field period before the display timing of the 4:3 motion picture in Period I. In addition, since the picture reading unit 108 performs read operations in synchronism with operations of the non-illustrated display output device, it is not possible to perform read operations from the picture memory 105 at earlier timing. Further, the picture writing unit 104 is required to complete the write operation to the picture memory 105 by the time a write-timing signal (wt) is generated in Period I. Thus, it is not possible to delay the timing of the write operation.

As a consequence, it is inevitable that the write operation overtakes the read operation in Period H, which leads to image disturbance.

1.2.4 Operations According to the Present Invention

Figure 9:
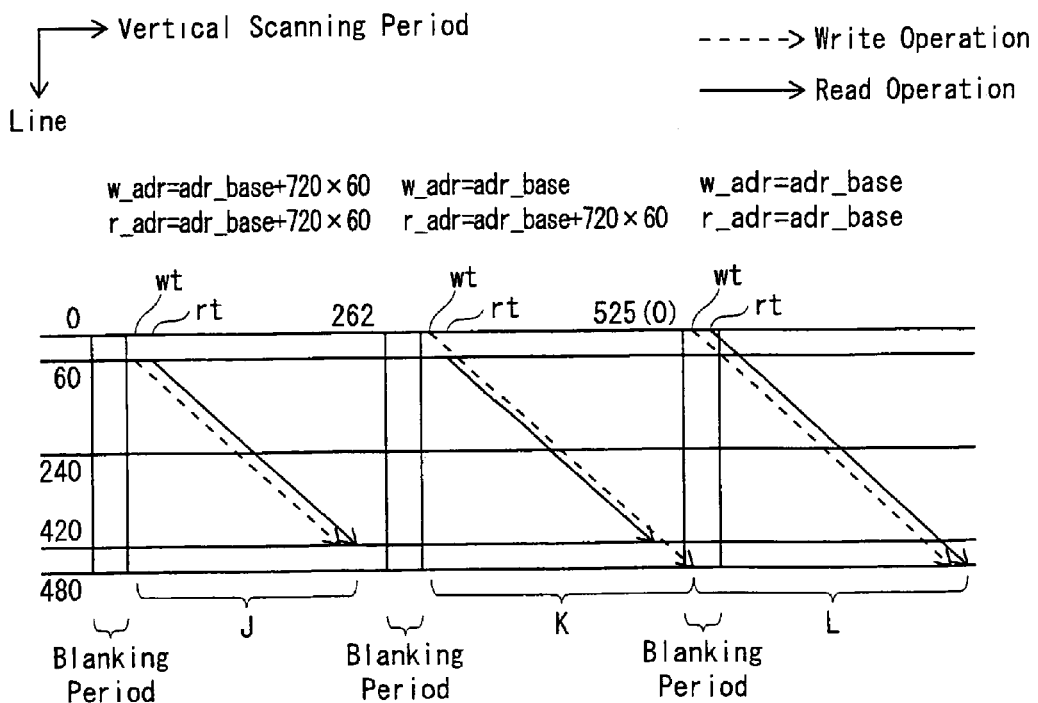
FIG. 9 schematically illustrates write and read operations performed by the motion picture display device having the address generating unit 102 to sequentially display motion pictures having different aspect ratios.

The following describes operations of the motion picture display device having the address generating unit 102 according to the present invention. FIG. 9 schematically illustrates write and read operations performed by the motion picture display device having the address generating unit 102 to sequentially display motion pictures having different aspect ratios.

Note that Periods J. L, . . . are vertical scanning periods of the top field, whereas Periods K, . . . are vertical scanning periods of the bottom field.

In Period J, a write operation is performed to write the bottom field data of the last frame of a motion picture having a 16:9 aspect ratio.

Next, in Period K, a read operation is performed to display picture data of the 16:9 motion picture. In addition, a write operation is performed to write the top field data of the first frame of a motion picture having a 4:3 aspect ratio in period K. In Period L and the following periods, read and write operations are performed to read and write data of the 4:3 motion picture.

In the case of picture data having an aspect ratio of 16:9, the write start address (w_adr) given by Expression 1 is as follows.

$$w\_adr = adr\_base + 720 \times 60$$

Thus, the read start address (r_adr) used in the read operation in Period K to read picture data having an aspect ratio of 16:9 is given as follows.

$$r\_adr = adr\_base + 720 \times 60$$

In the case of picture data having an aspect ratio of 4:3, the write start address (w_adr) and the read start address (r_adr) are both equal to the base address (adr_base)

In Period K, the write operation to write picture data of the 4:3 motion picture is started from Line 0 of the picture memory. On the other hand, the data read operation in Period K to read picture data of the 16:9 motion picture is started from Line 60 of the picture memory. That is to say, the write and read operations for the respective motion pictures are started from different memory address. By using different memory addresses, it is prevented that the write operation overtakes the read operation, even if the write start timing cannot be delayed or the read start timing cannot be advanced.

Note according to the embodiment 1 above, the picture writing unit 104 performs write operations to the picture memory 105 on a field-by-field basis. Yet, the write operations may be performed on a frame-by-frame basis.

Similarly, the picture reading unit 108 may perform read operations on a frame-by-frame basis. The components of the motion picture display device according to the present invention may be implemented in hardware or software.

1.2.5 Recapitulation

In the embodiment 1 above, the address generating unit 102 calculates the write start address (w_adr) using the ratio between the aspect ratio information (aspect) and the normal aspect ratio (aspect normal), as given by Expression 1. That is to say, the write start address (w_adr) is calculated in relation to the normal motion picture aspect ratio.

As described above, a different write start addresses (w_adr) is calculated for each motion picture to be displayed. With this arrangement, accesses to the memory within one field period are made always at the same address and at the same timing. Thus, the present invention achieves to prevent overtaking of a write operation by a read operation, and vice versa.

Embodiment 2

Next, a description is given of an embodiment 2 of the present invention. The embodiment 2 differs from the embodiment 1 in that the write start address (w_adr_2) is calculated based on the position of a display plane in which a motion picture is to be displayed.

The following mainly describes the difference with the embodiment 1.

<Structure>

2.1 Structure

Figure 10:
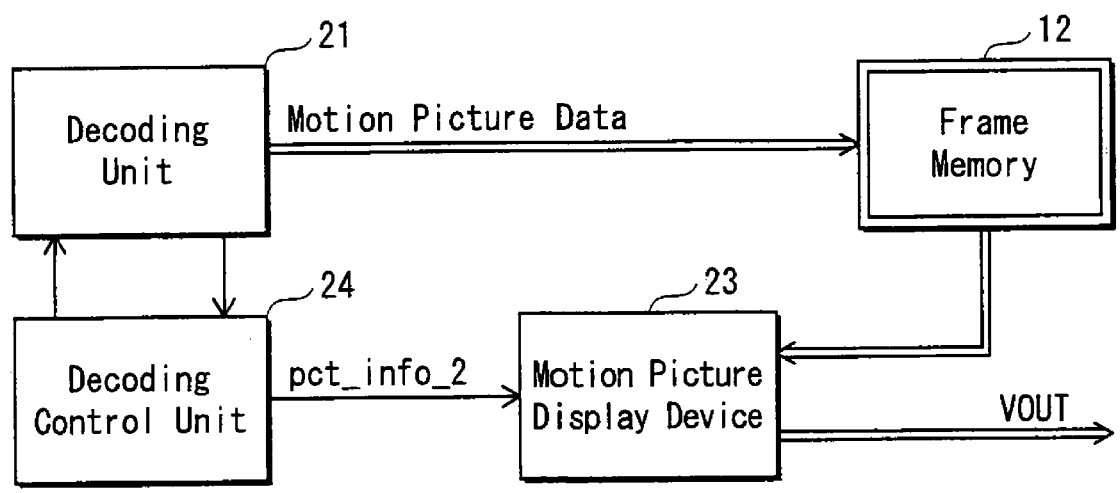
FIG. 10 illustrates the overall structure of a motion picture decoder 2.

FIG. 10 illustrates the overall structure of a motion picture decoder 2 according to the present invention.

The motion picture decoder 2 includes a decoding unit 21, a frame memory 12, a motion picture display device 23, and a decoding control unit 24.

Note that the frame memory 12 is identical to that of the embodiment 1 and thus no description thereof is given.

2.1.1 Decoding Unit 21

The decoding unit 21 decodes an encoded stream in accordance with a decoding control signal issued from the decoding control unit 24. The decoding unit 21 then writes picture data obtained as a result of the decoding to the frame memory 12. In addition, the decoding unit 21 supplies decoding result information to the decoding control unit 24. The decoding unit 21 acquires the decoding result information by executing the decoding. The decoding result information indicates the configuration of decoded picture data, such as a picture size and aspect ratio.

2.1.2 Decoding Control Unit 24

The decoding control unit 24 receives display information indicating the display format of picture data from a non-illustrated device. The display information includes, for example, information indicating the display plane position of picture data. The decoding control unit 24 generates picture-configuration information (pct_info_2) based on the decoding result information supplied from the decoding unit 21 and the display information input from the non-illustrated device. The decoding control unit 24 then outputs the generated picture-configuration information (pct_info_2) to the motion picture display device 23. Note that the picture-configuration information (pct_info_2) includes aspect ratio information (aspect), plane position information (plane_pos) indicating the display plane position of picture data, and the vertical size (v_size). The plane position information (plane_pos) includes information indicating the vertical and horizontal positions of the display plane of picture data.

Note that in the case where the motion picture decoder 2 is not capable of displaying motion pictures having different aspect ratios, the picture-configuration information (pct_info_2) may be without aspect ratio information (aspect).

2.1.3 Motion Picture Display Device 23

The motion picture display device 23 receives the picture-configuration information (pct_info_2) from the decoding control unit 24. In addition, the motion picture display device 23 sequentially reads picture data from the frame memory 12 and outputs the read picture data as display image (VOUT) to a non-illustrated display output device.

Now, a detailed description of the motion picture display device 23 is given.

Figure 11:
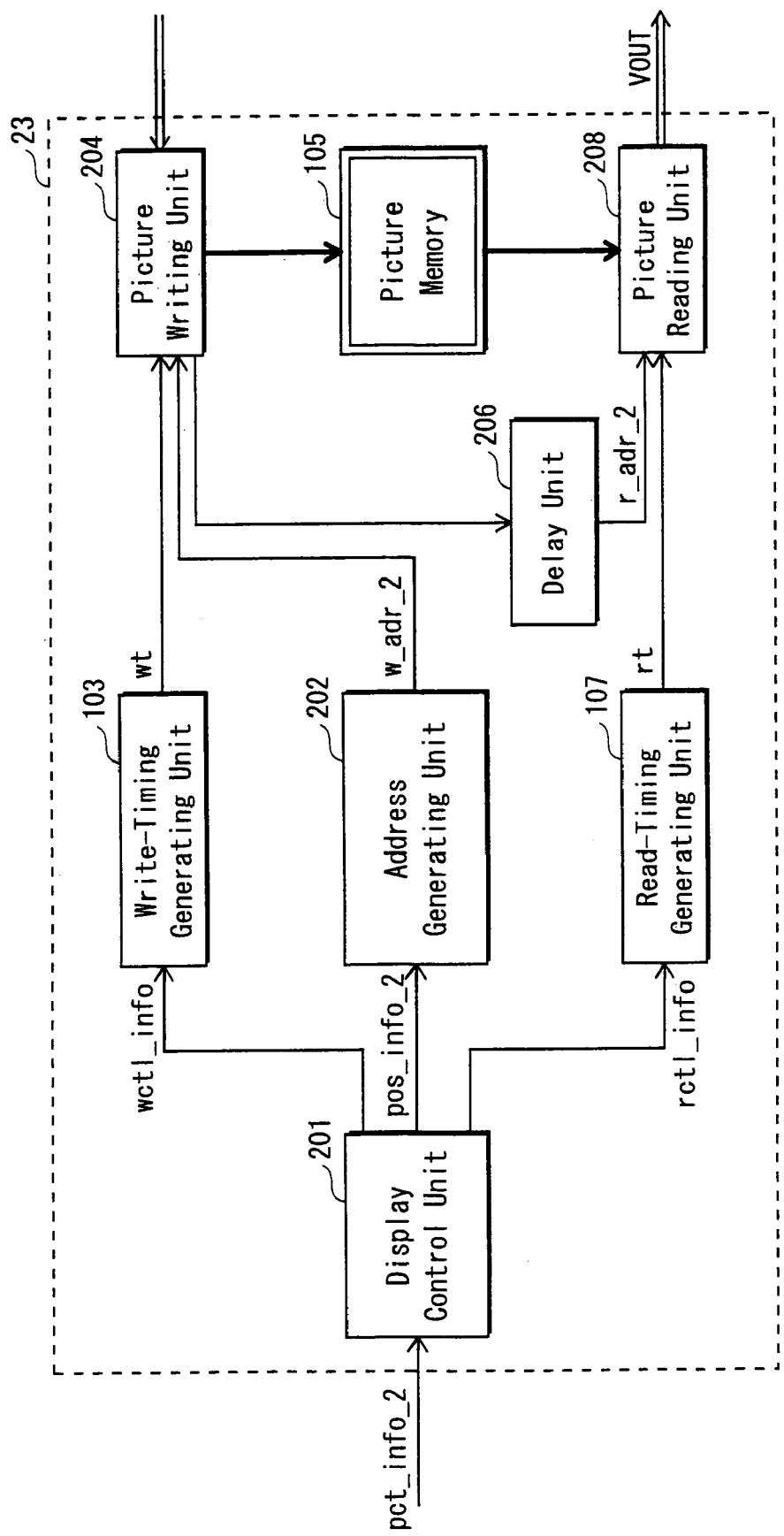
FIG. 11 illustrates the internal structure of a motion picture display device 23.

FIG. 11 illustrates the internal structure of the motion picture display device 23 according to the embodiment 2.

As illustrated in FIG. 11, the motion picture display device 23 includes a display control unit 201, an address generating unit 202, a write-timing generating unit 103, a picture writing unit 204, a picture memory 105, a delay unit 206, a read-timing generating unit 107, and a picture reading unit 208.

Note that the write-timing generating unit 103, the picture memory 105, and the read-timing generating unit 107 are identical to the corresponding components described in the embodiment 1. Thus, the same reference numerals are used to refer to those components and no further description is given.

2.1.3.1 Display Control Unit 201

The display control unit 201 differs from the display control unit 101 of the embodiment 1 in that the picture-configuration information (pct_info_2) includes vertical plane position information (v_plane_pos) indicating the vertical position of the display plane.

The display control unit 201 controls the display position and display timing of picture data on a non-illustrated display device.

The difference with the display control unit 101 according to the embodiment 1 lies in that the display control unit 201 receives the picture-configuration information (pct_info_2) output from the decoding control unit 24 and extracts aspect ratio information (aspect), plane position information (plane_pos), and vertical size (v_size) from the received picture-configuration information (pct_info_2). In addition, the display control unit 201 extracts the vertical plane position information (v_plane_pos) from the plane position information (plane_pos). The display control unit 201 outputs the extracted aspect ratio information (aspect), the vertical size (v_size), and the vertical plane position information (v_plane_pos) as display position information (pos_info_2) to the address generating unit 202.

Different from the display position information (pos_info) according to the embodiment 1, the display position information (pos_info_2) includes the vertical plane position information (v_plane_pos).

Similarly to the display control unit 101 according to the embodiment 1, the display control unit 201 outputs the write control information (wctl_info) to the write-timing generating unit 103, and outputs the read control information (rctl_info) to the read-timing generating unit 107.

2.1.3.2 Address Generating Unit 202

The notable difference with the address generating unit 102 according to the embodiment 1 is that the address generating unit 202 calculates the write start address (w_adr_2) using the vertical plane position information (v_plane_pos).

The address generating unit 202 receives display position information (pos_info_2) output from the display control unit 201. The address generating unit 202 then calculates the write start address (w_adr_2) of the picture memory 105 given by the following Expression 2 below. That is, the address generating unit 202 calculates the write start address (w_adr_2) using the aspect ratio information (aspect), the vertical size (v_size), and the vertical plane position information (v_plane_pos) contained in the received display position information (pos_info_2). The thus calculated write start address (w_adr_2) is output to the picture writing unit 204.

$$w\_adr\_2 = adr\_base + 720 \times v\_plane\_pos + 720 \times (v\_size - v\_plane\_pos) \times \{1 - aspect/aspect\_normal\}/2 \quad \text{[Expression 2]}$$

Hereinafter, an additional description of Expression 2 is given.

In the case where the motion picture decoder 2 is not capable of displaying a motion picture having any aspect ratio other than the normal aspect ratio, the address may be given by omitting the third term in the right side of Expression 2 so as not to calculate the ratio between the two aspect ratios.

Note that aspect and v_plane_pos in Expression 2 cannot take on values causing that the sum of the second and third terms results in a negative value. Similarly to Expression 1 used in the embodiment 1, the value "720" represents the line size of the picture memory 105.

Because of the third term in Expression 2, overtaking of a read operation by a write operation, and vice versa is prevented at the time of a changeover between two motion pictures having different aspect ratios. The description of a changeover between two motion pictures having different aspect ratios is given above in the embodiment 1. In view of this, in the embodiment 2, it is assumed that two motion pictures both have an aspect ratio of 4:3 but different plane position information (plane_pos).

2.1.3.3 Picture Writing Unit 204

The difference with the picture writing unit 104 according to the embodiment 1 lies in that the picture writing unit 204 uses not the write start address (w_adr) but the write start address (w_adr_2) generated by the address generating unit 202.

The picture writing unit 204 receives a write start address (w_adr_2) output from the address generating unit 202, and also receives a write-timing signal (wt) output from the write-timing generating unit 103. Upon receipt of the write-timing signal (wt), the picture writing unit 204 performs a write operation to write one field picture data to the picture memory 105, starting at the write start address (w_adr_2) on a line-by-line basis.

In parallel with the write operation, the picture writing unit 204 outputs the write start address (w_adr_2) received from the address generating unit 102 to the delay unit 206.

2.1.3.4 Delay Unit 206

The difference with the delay unit 106 according to the embodiment 1 lies in that the delay unit 206 uses not the write start address (w_adr) but the write start address (w_adr_2) calculated by the address generating unit 202.

The delay unit 206 receives the write start address (w_adr_2) from the picture writing unit 204 and outputs the, received write start address (w_adr_2) to the picture reading unit 208 for use as the read start address (r_adr_2). Note that the delay unit 206 outputs the write start address (w_adr_2) with a delay of one field period from the time of reception. That is say, the delay unit 206 so operates that the write start address (w_adr_2) at which the picture writing unit 204 performs a write operation is caused to be used as the read start address (r_adr_2) in a subsequent read operation that is performed by the picture reading unit 208 one field period after the write operation.

2.1.3.5 Picture Reading Unit 208

The difference with the picture reading unit 108 according to the embodiment 1 lies in that the picture reading unit 208 uses not the read start address (r_adr) but the read start address (r_adr_2) output from the delay unit 206.

The picture reading unit 208 reads picture data from the picture memory 105 at the predetermined memory address and outputs the read picture data to the non-illustrated display device.

More specifically, the picture reading unit 208 receives the read start address (r_adr_2) output from the delay unit 206, and also receives a read-timing signal (rt) output from the read-timing generating unit 107. Upon receipt of the read-timing signal (rt), the picture reading unit 208 reads picture data from the picture memory 105, starting at the read start address (r_adr_2) on a line-by-line basis. The thus read picture data is sequentially output to the non-illustrated display output device as display image (VOUT).

2.2 Operations

Next, operations of the motion picture display device 23 according to the embodiment 2 will be described. The difference with the operations of the motion picture display device 13 according to the embodiment 1 lies mainly in the calculation of the write start address (w_adr_2) by the address generating unit 202. Operations performed by the display control unit 201 and other units are basically similar to operations performed by the display control unit 101 and other units according to the embodiment 1. Thus, a detailed description thereof is omitted.

The following describes write and read operations to/from the picture memory 105, with reference to the drawings.

2.2.1 Displaying Motion Picture at Line 0

Figure 12:
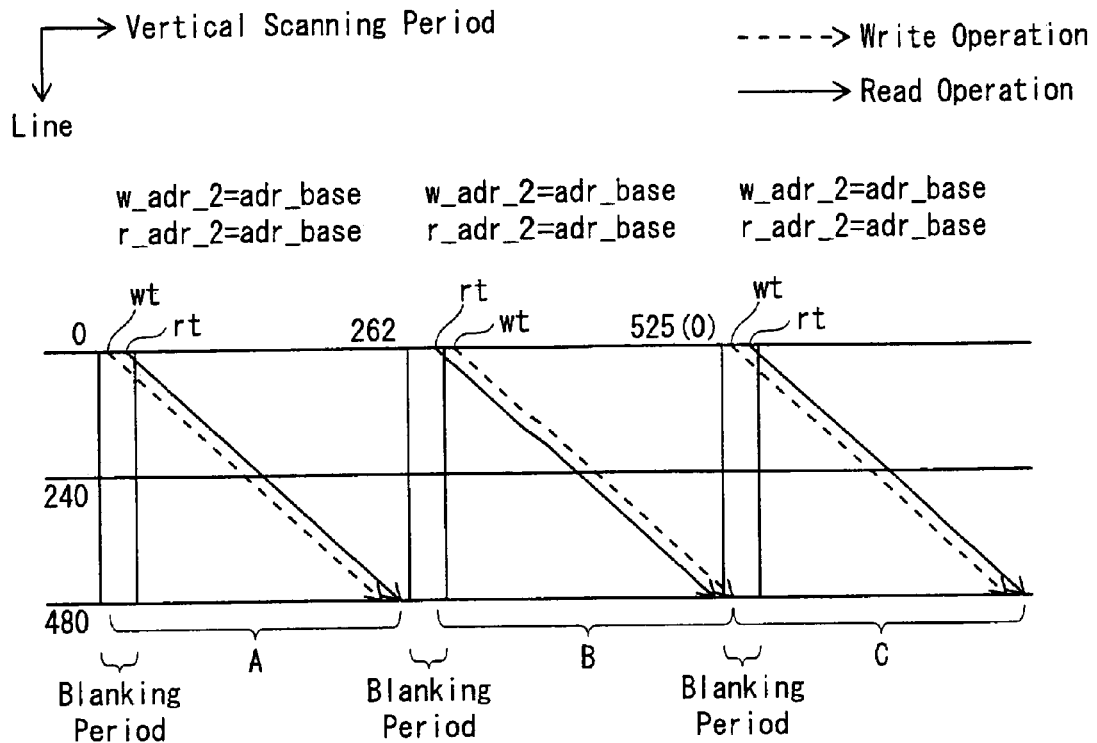
FIG. 12 schematically illustrates write and read operations performed to display picture data having the vertical size of 480 lines and the vertical plane position at Line 0.

FIG. 12 schematically illustrates write and read operations performed to display picture data having the vertical size of 480 lines and the vertical plane position at Line 0.

Similarly to FIG. 6 referred in the embodiment 1, the horizontal axis in FIG. 12 represents the vertical scanning period, whereas the vertical axis represents the line numbers of the picture memory 105. The dashed arrows represents write operations to the picture memory 105, whereas the solid-line arrows represent read operations from the picture memory 105. In addition, FIG. 12 illustrates a plurality of vertical scanning periods each corresponding to one field (Periods A, B, C, . . . ). Periods A, C . . . are vertical scanning periods of the top field, whereas Periods B, . . . are vertical scanning periods of the bottom field.

The write start address (w_adr_2) given by Expression 2 is equal to the base address (adr_base). Consequently, write and read operations to/from the picture memory 105 are all started from Line 0.

In each vertical scanning period of the top field (Periods A, C . . . ), a write operation to write the bottom field data is performed before a read operation to read data from the picture memory 105. Triggered by a write-timing signal (wt), the picture writing unit 204 starts a write operation to write the bottom field. Then, triggered by a read-timing signal (rt), the picture reading unit 208 starts a read operation to read data from the picture memory 105.

In each vertical scanning period (periods B, . . . ) of the bottom field, a read operation to read data from the picture memory 105 is started before a write operation to write the top field data.

2.2.2 Displaying Motion Picture at Line 240

Figure 13:
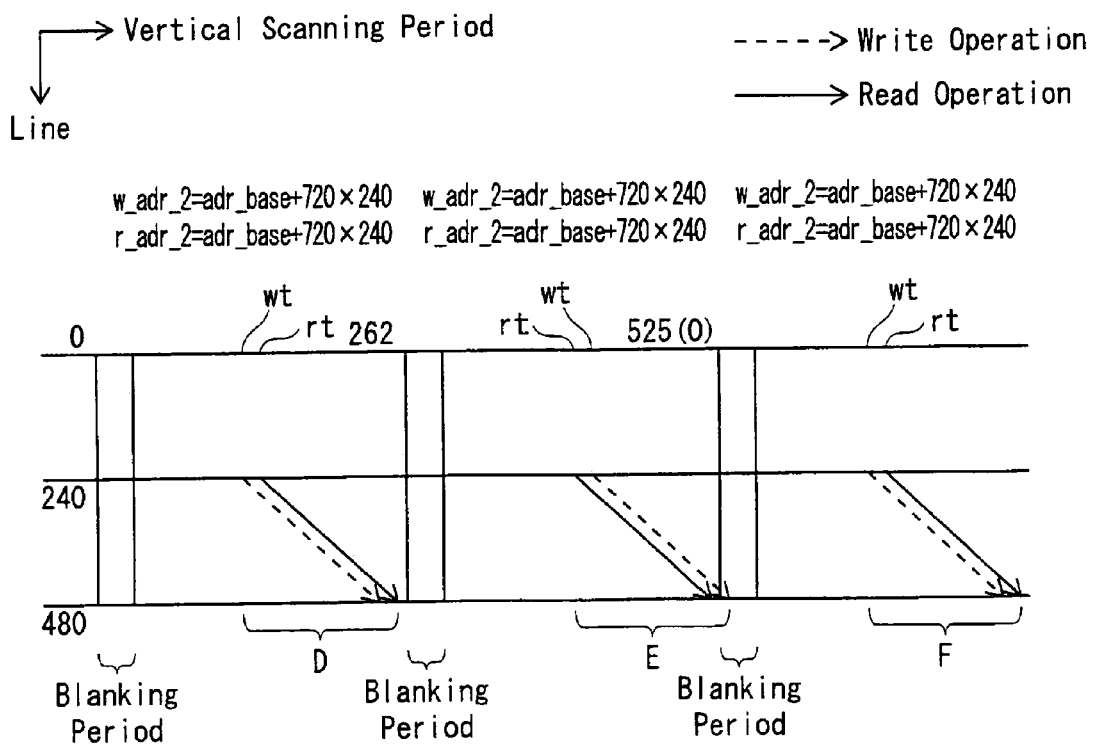
FIG. 13 schematically illustrates write and read operations performed to display picture data having the vertical size of 240 lines and the vertical plane position at Line 240.

FIG. 13 schematically illustrates write and read operations performed to display picture data having the vertical size of 240 lines and the vertical plane position at Line 240. Periods D, F, . . . are the vertical scanning periods of the top field, whereas Period E, . . . are the vertical scanning periods of the bottom field.

The write start address (w_adr_2) given by Expression 2 is calculated as follows.

$$w\_adr\_2 = adr\_base + 720 \times 240$$

Thus, write and read operations to/from the picture memory 105 are started from Line 240.

The picture reading unit 208 needs to perform read operations from the picture memory 105 in accordance with the display timing of the non-illustrated display output device. Thus, a read-timing signal (rt) is issued with a delay in comparison with a read-timing signal issued for displaying a motion picture having the vertical size of 480 lines and the vertical plane position at Line 0. The delay time corresponds to 120 lines, which are half of 240 lines. This is because a write operation is performed on a field-by-field basis to write data to every other line. Naturally, a write-timing signal (wt) is issued with a delay corresponding to 120 lines, in comparison with a write-timing signal issued for displaying a motion picture having the vertical size of 480 lines and the vertical plane position at Line 0.

2.2.3 Changeover Between Motion Pictures Having Different Display Plane Positions The following describes operations performed at the time of a changeover between motion pictures having different display plane positions.

First, a description is given of operations performed by a conventional motion picture device not having the address generating unit 202, which is a feature of the present invention.

Figure 14:
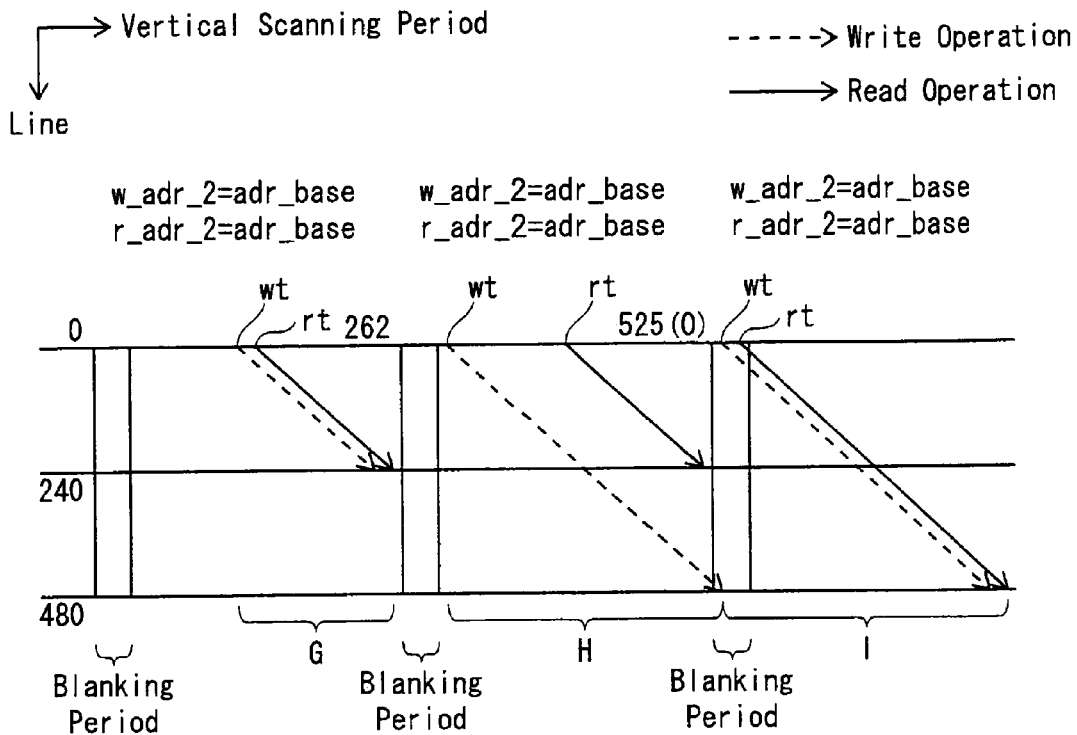
FIG. 14 schematically illustrates write and read operations performed by a device not having an address generating unit 202 to sequentially display motion pictures having different display plane positions.

FIG. 14 schematically illustrates write and read operations performed by the conventional motion picture display device not having the address generating unit 202 to sequentially display motion pictures having different display plane positions. The example illustrated in FIG. 14 is of a changeover from a first motion picture to a second motion picture. The first motion picture has the vertical size of 240 lines and the vertical plane position at Line 240, whereas the second motion picture has the vertical size of 480 lines and the vertical plane position at Line 0. Without the address generating unit 202, the write start address (w_adr_2) and read start address (r_adr_2) used by the conventional motion picture display device for write and read operations to/from the picture memory 105 are always equal to the base address (adr_base).

Note that Periods G, I, . . . are vertical scanning periods of the top field, whereas Periods H, . . . are vertical scanning periods of the bottom field.

In Period G, the bottom field data of the last frame of the first motion picture (vertical size: 240 lines, vertical plane position: Line 240) is written.

Next, in Period H, a read operation to display the first motion picture (vertical size: 240 lines, vertical plane position: Line 240) and a write operation to write the top field data of the first frame of the second motion picture (vertical size: 480 lines, vertical plane position: Line 0) are performed. In each of Period I and the following periods, read/write operations are performed to display the second motion picture.

In Period H, the timing of the read operation to read picture data of the first motion picture is delayed for 120 lines, as compared with the timing of a read operation to read picture data of the second-motion picture.

On the other hand, however, the write operation in Period H to write picture data of the second motion picture is started one field period before the display timing of the second motion picture in Period I. In addition, since the picture reading unit 208 performs read operations in synchronism with operations of the non-illustrated display output device, it is not possible to perform read operations from the picture memory 105 at earlier timing. Further, the picture writing unit 204 is required to complete the write operation to the picture memory 105 by the time a write-timing signal (wt) is generated in Period I. Thus, it is not possible to delay the timing of the write operation.

As a consequence, it is inevitable that the write operation overtakes the read operation in Period H, which leads to image disturbance.

2.2.4 Operations According to the Present Invention

Figure 15:
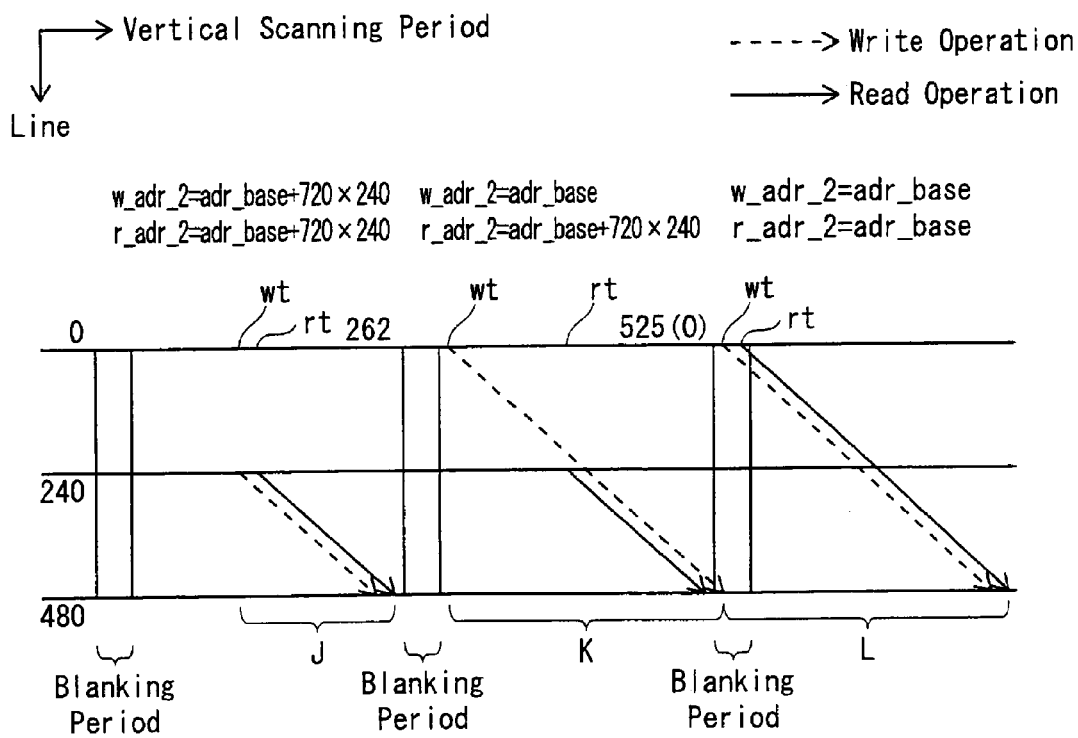
FIG. 15 schematically illustrates write and read operations performed by the motion picture display device having the address generating unit 202 to sequentially display motion pictures having different display plane positions.

The following describes operations by the motion picture display device having the address generating unit 202 according to the present invention. FIG. 15 schematically illustrates write and read operations performed by the motion picture display device having the address generating unit 202 to sequentially display motion pictures having different display plane positions.

Note that Periods J, L, . . . are vertical scanning periods of the top field, whereas Periods K, . . . are vertical scanning periods of the bottom field.

In Period J, a write operation is performed to write the bottom field data of the last frame of the first motion picture having an aspect ratio of 16:9.

Next, in Period K, a read operation is performed to display picture data of the first motion picture having the vertical size of 240 lines and the vertical plane position at Line 240. In Period K, in addition, a data read operation is performed to write the top field data of the second motion picture having the vertical size of 480 lines and the vertical plane position at Line 0. In Period L and the following periods, read/write operations are performed to read/write picture data of the second motion picture.

In the case of a motion picture having the vertical size of 240 lines and the vertical plane position at Line 240, the write start address (w_adr_2) given by Expression 2 is calculated as follows.

$$w\_adr\_2 = adr\_base + 720 \times 240$$

Thus, the read start address (r_adr_2) at which picture data having the vertical size of 240 lines and the vertical plane position at Line 240 is read in Period K is calculated as follows.

$$r\_adr\_2 = adr\_base + 720 \times 240.$$

In the case of a motion picture having the vertical size of 480 lines and the vertical plane position at Line 0, the write start address (w_adr_2) and read start address (r_adr_2) are always equal to adr_base.

In Period K, the write operation to read picture data of the second motion picture (vertical size: 480 lines, vertical plane position: Line 0) is started from Line 0 of the picture memory, whereas the read operation to read picture data of the first motion picture (vertical size: 240 lines, vertical plane position: Line 240) is started from Line 240 of the picture memory. That is to say, the write and read operations for the respective motion pictures are started from different memory address. By using different memory addresses, it is prevented that the read operation overtakes the write operation, even if the write start timing cannot be delayed or the read start timing cannot be advanced.

Note in the embodiment 2 described above, the picture writing unit 204 performs write operations to the picture memory 105 on a field-by-field basis. Yet, the write operations may be performed on a frame-by-frame basis.

Similarly, the picture reading unit 208 may perform read operations on a frame-by-frame basis. In addition, the components of the motion picture display device according to the present invention may be implemented in hardware or software.

<Supplemental Note>

Up to this point, the motion picture display device according to the present invention has been described by the specific embodiments. Yet, it goes without saying that the present invention is not limited to the motion picture display devices according to the above embodiments and various modifications including the following may be made to the present invention.

(1) The above embodiments relate to sequential display of two different types of motion pictures having, for example, different aspect ratios of 4:3 and 16:9. Yet, the present invention is not limited to such and may be employed to sequentially display more than two different types of motion pictures.

(2) According to the above embodiments, the write start address (w_adr) is calculated based on, for example, the aspect ratio information (aspect) and vertical plane position information (v_plane_pos). Yet, the present invention is not limited to such. The write start address (w_adr) may be calculated using other information with which the display position of the motion picture can be specified. For example, if the vertical size (v_size) can be used to specify the display position of the motion picture, the write start address (w_adr) may be calculated using the vertical size.

(3) Physically, each of the above device is a computer system composed of a microprocessor, ROM, RAM, hard disk unit, display unit, keyboard, mouse, and possibly other components. The RAM or hard disk unit stores a computer program. The microprocessor operates in accordance with the computer program, so that each device carries out the respective functions. The computer program is a combination of instructions for causing the computer to carry out the predetermined functions.

(4) Some or all of the components of each device described above may be implemented in a single system LSI (Large Scale Integration) circuit. The system LSI is a large scale integrated circuit composed of multiple modules fabricated on a single chip. Specifically, the system LSI is a computer system composed of a microprocessor, ROM, RAM, and possibly other components. The RAM stores a computer program. The microprocessor operates in accordance with the computer program, so that the system LSI carries out its functions.

(5) Some or all of the components of each device described above maybe implemented in an IC card detachable to the respective device or in a single module. The IC card or module is a computer system composed of a microprocessor, ROM, RAM, and possibly other components. The IC card or module may include the large scale integrated circuit mentioned above. The RAM stores a computer program. The microprocessor operates in accordance with the computer program, so that the IC card or module carries out its functions. In addition, the IC card or module may be made tamper-resistant.

(6) The present invention may be embodied as any of the methods described above or a computer program for causing a computer to execute such a method. Furthermore, the present invention may be embodies as a digital signal representing such a computer program.

Still further, the present invention may be embodied as a computer-readable recording medium storing the computer program or digital signal mentioned above. Examples of compute-readable recording media includes a flexible disk, hard disk, CD-ROM, MO, DVD, DVD-ROM, DVD-RAM, BD (Blu-ray Disc), and semiconductor memory. Still further, the present invention may be embodied the computer program or digital signal per se stored on such a recording medium.

Still further, the present invention may be embodied as the computer program or digital signal that is transmitted via a telecommunication network, wireless or wired communication network, a network typified by the Internet, or data broadcasting.

Still further, the present invention may be embodied as a computer system composed of a microprocessor and memory. The memory stores the computer program mentioned above and the microprocessor operates in accordance with the computer program.

Still further, the program or digital signal mentioned above may be transferred in form of a recording medium mentioned above, or via a network mentioned above, so that the program or digital signal maybe executed by another independent computer system.

(7) The present invention may be embodied as any combination of the above-described embodiments and modifications.

(8) The present invention is suitably applicable to a motion picture display device for sequentially displaying motion pictures having different aspect ratios and/or display plane positions.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A motion picture display device for sequentially displaying two types of motion pictures having different aspect ratios, each motion picture being displayed by repeating a cycle of writing picture data to and reading the picture data from a picture memory in accordance with display timing that is determined relatively to an aspect ratio of the picture data, said motion picture display device comprising:

an acquiring unit operable to acquire an aspect ratio of picture data that is currently targeted to be displayed;

an address generating unit operable to calculate a write start address in accordance with the acquired aspect ratio of the target picture data;

a picture writing unit operable to write the target picture data to the picture memory, staring at the write start address and at a point in time determined by display timing of the target picture data;

a picture reading unit operable to read the target picture data from the picture memory, starting at a read start address, that is equal to the write start address and substantially in synchronism with the display timing of the target picture data; and a delay unit operable to control timing of reading from and writing to the picture memory, so that the reading is started a certain time after the writing is started.

2. The motion picture display device of claim 1, wherein the address generating unit includes:

a storage subunit operable to store a normal aspect ratio indicating an aspect ratio of a reference motion picture; and a calculating subunit operable to calculate the write start address based on a ratio between the normal aspect ratio and the acquired aspect ratio.

3. The motion picture display device of claim 2, wherein the address generating unit is operable to calculate the write start address w_adr using the following expression:

$$w\_adr = adr\_base + line\_size \times v\_size \times \{1 - aspect/aspect\_normal\}/2$$

where adr_base denotes a base address of the picture memory, line_size denotes a line size of the picture memory, v_size denotes a vertical size of the picture data, aspect denotes the aspect ratio of the target picture data, and aspect_normal denotes the normal aspect ratio.

4. The motion picture display device of claim 2, wherein the calculating subunit is operable to calculate the write start address in accordance with a display start position of the motion picture that is determined relatively to the ratio between the two aspect ratios.

5. The motion picture display device of claim 1, further comprising:

a decoding unit operable to decode an encoded motion picture, wherein:

the decoding unit is operable to generate the aspect ratio of the target picture data upon decoding; and the acquiring unit is operable to acquire the aspect ratio generated by the decoding unit.

6. The motion picture display device of claim 1, wherein:

the acquiring unit is operable to acquire plane information indicating a vertical position of a motion picture display plane; and the address generating unit is operable to calculate the write start address based on the acquired aspect ratio of the target picture data and the plane information.

7. The motion picture display device of claim 2, wherein:

the acquiring unit includes a plane information acquiring subunit operable to acquire plane information indicating a vertical position of a motion picture display plane; and the address generating unit is operable to calculate the write start address w_adr using the following expression:

$$w\_adr = adr\_base + line\_size \times v\_plane\_pos + line\_size \times (v\_size - v\_plane\_pos) \times \{1 - aspect/aspect\_normal\}/2$$

where adr_base denotes a base address of the picture memory, line_size denotes a line size of the picture memory, v_plane_pos denotes the plane information, v_size denotes a vertical size of the picture data, aspect denotes the aspect ratio of the target picture data, and aspect_normal denotes the normal aspect ratio.

8. A motion picture display device for sequentially displaying two types of motion pictures having different display plane positions, each motion picture being displayed by repeating a cycle of writing picture data to and reading the picture data from a picture memory in accordance with display timing that is determined relatively to a display plane position of the picture data, said motion picture display device comprising:

an acquiring unit operable to acquire plane information indicating a display plane position of picture data that is currently targeted to be displayed;

an address generating unit operable to calculate a write start address in accordance with the acquired plane information;

a picture writing unit operable to write the target picture data to the picture memory, staring at the write start address and at a point in time determined by display timing of the target picture data;

a picture reading unit operable to read the target picture data from the picture memory, starting at a read start address that is equal to the write start address and substantially in synchronism with the display timing of the target picture data, and a delay unit operable to control timing of reading from and writing to the picture memory, so that the reading is started a certain time after the writing is started.

9. The motion picture display device of claim 8, further comprising:

a decoding unit operable to decode an encoded motion picture, wherein:

the decoding unit is operable to generate the plane information upon decoding the target picture data; and the acquiring unit is operable to acquire the plane position information generated by the decoding unit.

10. A motion picture display method for use by a motion picture display device that sequentially displays two types of motion pictures having different aspect ratios, each motion picture being displayed by repeating a cycle of writing picture data to and reading the picture data from a picture memory in accordance with display timing that is determined relatively to an aspect ratio of the picture data, said motion picture display method comprising:

an acquiring step of acquiring an aspect ratio of picture data that is currently targeted to be displayed;

an address generating step of calculating a write start address in accordance with the acquired aspect ratio of the target picture data;

a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data, wherein timing of reading from and writing to the picture memory is controlled so that the reading is started a certain time after the writing is started.

11. A motion picture display method for use by a motion picture display device that sequentially displays two types of motion pictures having different display plane positions, each motion picture being displayed by repeating a cycle of writing picture data to and reading the picture data from a picture memory in accordance with display timing that is determined relatively to a display plane position of the picture data, said motion picture display method comprising:

an acquiring step of acquiring plane information indicating a display plane position of picture data that is currently targeted to be displayed;

an address generating step of calculating a write start address in accordance with the acquired plane information;

a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data, wherein timing of reading from and writing to the picture memory is controlled so that the reading is started a certain time after the writing is started.

12. A computer-readable recording medium storing the computer-readable control program composed to be executed by a motion picture display device that sequentially displays two types of motion pictures having different aspect ratios, each motion picture being displayed by repeating a cycle of writing picture data to and reading the picture data from a picture memory in accordance with display timing that is determined relatively to an aspect ratio of the picture data, said control program comprising code operable to cause the motion picture display device to perform:

an acquiring step of acquiring an aspect ratio of picture data that is currently targeted to be displayed;

an address generating step of calculating a write start address in accordance with the acquired aspect ratio of the target picture data;

a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data, wherein timing of reading from and writing to the picture memory is controlled so that the reading is started a certain time after the writing is started.

13. A computer-readable recording medium storing the computer-readable control program composed to be executed by a motion picture display device that sequentially displays two types of motion pictures having different display plane positions, each motion picture being displayed by repeating a cycle of writing picture data to and reading the picture data from a picture memory in accordance with display timing that is determined relatively to a display plane position of the picture data, said control program comprising code operable to cause the motion picture display device to perform:

an acquiring step of acquiring plane information indicating a display plane position of picture data that is currently targeted to be displayed;

an address generating step of calculating a write start address in accordance with the acquired plane information;

a picture writing step of writing the target picture data to the picture memory, staring at the write start address and at a point in time determined by display timing of the target picture data; and a picture reading step of reading the target picture data from the picture memory, starting at a read start address that is equal to the write start address and substantially in synchronism with the display timing of the target picture data, wherein timing of reading from and writing to the picture memory is controlled so that the reading is started a certain time after the writing is started.

* * * * *